United States Patent [19]

Ueda et al.

[11] Patent Number: 5,175,618
[45] Date of Patent: Dec. 29, 1992

[54] COMPRESSION METHOD FOR INTERLACE MOVING IMAGE SIGNALS

[75] Inventors: Motoharu Ueda; Yasuhiro Yamada, both of Yokohama, Japan

[73] Assignee: Victor Company of Japan, Ltd., Yokohama, Japan

[21] Appl. No.: 784,214

[22] Filed: Oct. 30, 1991

[30] Foreign Application Priority Data

Oct. 31, 1990 [JP] Japan .................................. 2-294974
Mar. 18, 1991 [JP] Japan .................................. 3-78552

[51] Int. Cl.[5] .......................................... H04N 7/137
[52] U.S. Cl. ...................................... 358/136; 358/105
[58] Field of Search ................................ 358/136, 105

[56] References Cited

U.S. PATENT DOCUMENTS 5,111,292  5/1992  Kuriacose .......................... 358/133

Primary Examiner—Howard W. Britton
Attorney, Agent, or Firm—Jacobson, Price, Holman & Stern

[57] ABSTRACT

A compression method for moving picture signals that are interlace moving pictures, when prediction coding is used as the method of compressing image signals, divides an input frame image into input field images, divides a comparison frame image into comparison field images, detects a motion vector of the input field image with respect to those comparison field images, and makes an extracted motion vector which is smaller than the value for evaluation of prediction error, the motion vector for motion compensation prediction coding. In addition, a reference frame is set for each predetermined inter-frame interval, and the field image signals of one of the reference frame image signals have intra-field coding performed by linking inside fields, while the other of the field image signals indergoes inter-field coding on the basis of signals that have undergone coding processing for the other field image signal or the image signals of it, while the other frame image signal undergoes inter-frame coding on the basis of field image signals corresponding to the reference frame that comes either before or after it, or those signals that have undergone coding processing.

8 Claims, 12 Drawing Sheets

TIME ⟶

COMPRESSION METHOD FOR INTERLACE MOVING IMAGE SIGNALS

BACKGROUND OF THE INVENTION

The present invention relates to a compression method for (digital) moving images that have been interlaced, and more particularly, relates to a favorable predictive coding method for image signals in media of storage systems.

The motion compensation inter-frame predictive coding method shown in FIG. 1 is known as an effective method for the compression of moving image (signals). This method detects an amount of motion (motion vector) between an input image and a comparison image, and subtracts from the input image the prediction image that has been shifted comparison image by the motion vector and codes this error value and the motion vector.

The motion vector is generally detected using the block matching method. In this method, an image for processing is desirably a frame image which is not interlaced. If there is the detection of a motion vector with respect to a frame image that is still interlaced, then the influence of a time difference between two fields and resulting from the interlacing increases the high-frequency component in the vertical direction of the frame, and reduces the correlation in the vertical direction, between the input image and the comparison image. As a result, the accuracy decreases with respect to the detected motion vector, thereby increasing the error value between the input image and the prediction image.

Here, when the image for processing is an interlace image, it is known that the method of generating a non-interlaced frame from two fields, and detecting the motion vector with respect to that frame and performing predictive coding prevents deterioration of the accuracy of the motion vector.

The methods for the generation of a frame image that is not interlaced, are a method where a frame is generated by simply interpolating one field, and as shown in FIG. 2, a method that judges a motion region and a still region from both fields, and generates an application frame by pasting both fields in the still region and inserting either one field into the motion region.

In the method where a frame is generated by interpolating one field, the resolution in the vertical direction of the generated frame deteriorates by half and the quality of the image drops. In addition, in the method where the motion region and the still region are judged and a frame is generated applicably, the correlation in the vertical direction of the frame is reduced because of the insertion of unsuitable picture elements when there is not the accurate extraction of the still and motion regions between both fields, the accuracy of the motion vector greatly decreases and the prediction efficiency deteriorates.

Furthermore, in order to avoid obstruction in interlaced images such as this, there has been proposed the method shown in FIG. 3, where the two fields of odd-numbered fields and even-numbered fields are handled completely separately. In this method, there is no deterioration of the degree of resolution in the vertical direction and thus there is no deterioration of the accuracy of the motion vector, but there is the disadvantage that the separate processing for the fields prevents the use of the correlation between the respective fields.

By the way, when there is the recording and reproduction of image information that has undergone predictive coding, to and from storage media, it is necessary to provide image signals that become a reference at required intervals so that there can be the effective functioning of random access and search and the like.

With respect to non-interlaced image signals, the MPEG (Moving Picture Expert Group) has proposed standards for which standardization surveys were conducted in ISO IEC JTC1/SC2/WG8 as a method for inter-frame predictive coding for media of storage systems.

FIG. 4 is a view describing the coding sequence of the MPEG standards proposal.

This MPEG standards proposal sets a frame I that becomes the reference, at each required interval of frames, and this reference frame I is used as the basis for the setting of sub-reference frames for every M number of frames (where M is a natural number).

The reference frame I performs intra-frame coding.

The sub-reference frame P performs inter frame prediction in the uni or one direction from the previous reference frame I or the previous sub-reference frame P.

The other frame B performs frame prediction in both directions from the P frames or the I frames on both sides.

FIG. 5 is a block diagram of a coding apparatus of the MPEG standards proposal.

This coding apparatus 1 comprises a frame memory 3 that stores digital image signals 2a that are non-interlaced and which are supplied to an input terminal 2, a subtraction means 4 that generates prediction error signals 4a, a discrete cosine transformation circuit 5 that implements discrete cosine transformation, with respect to the prediction error signals 4a and outputs a transformation coefficient, a quantizer 6 that uses a coefficient having a required weighting to quantize a transformation coefficient 5a, a variable length coder 7 that codes a motion vector along with a quantized output 6a as well as information 9a relating to the calculation conditions, a local decoding means 8, an interframe motion compensation circuit 9, a motion vector detection circuit 10 and frame memories 11 and 12 for the forward and after directions.

The local decoding means 8 is provided with an adding means 15, an inverse discrete cosine transformation circuit 14 and a inverse quantizer 13 so as to decode the predictive error signals 4a.

The input digital image signals 2a are stored in the frame memory 3.

The image signals of the reference frame I are input as they are to the discrete cosine transformation circuit 5, undergo discrete cosine transformation, and the respective coefficients 5a that are transformed are quantized by the quantizer 6, are coded by the variable length coder 7 and are output as the coded data 7a.

The quantized output 6a is decoded by the local decoding means 8. These decoded image signals 8a are stored in the forward direction frame memory 11 or the after direction frame memory 12.

On the other hand, when there are image signals of a sub-reference frame P and another frame B, the motion vector detection circuit 10 determines the motion vector 10a between image signals of this frame and the decoded image signals 11a and 12a that are stored in the forward direction frame memory 11 and the after direction frame memory 12.

The motion vector 10a is detected using the block matching method for example, but some other method can be used.

The frame image for which the motion vector 10a has been determined has inter-frame motion compensation prediction performed by the inter-frame motion compensation prediction circuit 9, and the motion compensation prediction image signals 9b are generated.

When there is a sub-reference frame P, the image signals of the frame I (or P) that are stored in the forward direction frame memory 11 are used as the basis for the performance of motion compensation prediction in the forward direction.

When there is another frame B, the two types of frame image signals that are stored in the forward direction frame memory 11 and the backward direction frame memory 12 are used as the basis for motion compensation prediction for the three types of prediction methods of forward direction, backward direction, and forward and backward direction interpolation prediction, and the optimum prediction method is selected.

The prediction error signals 4a between the motion compensation prediction image signals 9b that are output from the inter-frame motion compensation prediction circuit 9 and the image signals of each of the input frames P and I, are processed by the discrete cosine transformation circuit 5, the quantizer 6 and the variable length coder 7 in the same manner as for the reference frame I described earlier, and the coded data 7a is output.

Moreover, with respect to a sub-reference frame P, the prediction image 9b and the output signals of the inverse cosine transformation circuit 14 are added by the adder circuit 15 and the configuration is such that the decoded image signals 8a that are obtained are stored in the forward direction frame memory 11 or the after direction frame memory 12.

However, the previously described MPEG standards proposal has non-interlaced image signals as its object and so there are the problems that were decribed earlier when such a coding method is used for the processing of interlaced image signals.

First, when each field of an interlace image is overlapped and handled as a frame, the influence of the time difference between two fields increases the high-frequency component in the vertical direction of the frame and reduces the coding efficiency by intra-frame coding.

In addition, in inter-frame prediction coding, the correlation in the vertical direction decreases in the same manner and even if motion compensation is performed, there are different amounts of motion between frames of two fields when there is zooming and the like and so the prediction efficiency decreases greatly to give an adverse influence on the image.

When the method shown in FIG. 3 is used with respect to inter-frame prediction, there is coding of prediction values between frames for both pairs of odd-numbered fields and pairs of even-numbered fields and two fields in a frame image for which intra-frame coding has been performed, have individual intra-field coding respectively performed for them.

In this case, there is no deterioration of the degree of resolution in the vertical direction of the frame, and there is no loss of the prediction accuracy between frames but since there is separate processing for the fields, it is not possible to use the correlation between the respective fields and in particular, there is the disadvantage that there is an increase in the amount of information in the intra-frame coding.

SUMMARY OF THE INVENTION

An object of the present invention is the provision of a compression method for moving picture signals, that selects an optimum motion vector from fields for frame image and that performs motion compensation predictive coding, so that the correlation between fields is effectively used in performing compression for an amount of information and so that it is possible to efficiently perform coding for interlace images.

In order to achieve the objective described above, the compression method for moving picture signals and according to a first aspect of the present invention, is a compression method for interlace moving pictures, and divides an input frame image into input field images, divides a comparison frame image corresponding to said input frame image into comparison field images, and detects a motion vector of said input field image with respect to those comparison field images, and also makes an extracted motion vector which is smaller than the value for evalution of prediction error, the motion vector for motion compensation prediction coding.

Furthermore, the present invention also provides a compression method for interlaced moving pictures as disclosed above, wherein a value in the vertical direction of a motion vector of an input field image with respect to a comparison field image is coded as a motion vector value of a comparison frame image and an input frame image of a frame image that is interlaced.

Still furthermore, the present invention also provides a compression method for interlaced moving pictures as disclosed above, wherein a value in the vertical direction of a motion vector of an input field image with respect to a comparison field image, is multiplied by two, and is coded with the appending of one bit of identification information that identifies whether the lowest bit of that value is a vector from an odd-numbered image or a vector from an even-numbered image.

In the compression method for interlaced moving pictures as described above, each comparison field image that is divided comparison frame image into some field images are respectively compared with an input field image which is divided, and the optimum vector is selected from motion vectors detected from comparison field images that are compared, and the optimum vector that is detected and selected is used as the basis for motion compensation prediction coding.

As has been described above, according to the compression method for interlace moving pictures according to a first aspect of the present invention, an optimum motion vector is selected from the respective fields in a frame image, and the motion compensation predictive coding is performed so that it is possible to avoid obstacles in the time direction due to the interlacing, and so that the correlation between fields is effectively used, and so that decoding is possible by coding the mount of motion as an interlaced frame image by the vector value and without the transfer of mode signals indicating field number, thereby enabling variable length coding to be performed and enable a large compression for an amount of information.

In order to eliminate the problems described earlier, a prediction coding method for interlace image signals and according to a second aspect of the present invention, is a prediction coding method for interlace image signals that form one frame for every two fields, and sets a reference frame for each predetermined inter-frame interval, and the field image signals of one of the reference frame image signals have intra-field coding performed by linking inside fields, while the other of the field image signals undergoes inter-field coding on the basis of signals that have undergone coding processing for the other field image signal or the image signals of it, while the other frame image signal undergoes inter-frame coding on the basis of field image signals corresponding to the reference frame that comes either before or after it, or those signals that have undergone coding processing.

Moreover, whether the other field image of reference frame is to be intra-field coded or inter-field coded can be for practical reasons, be determined in accordance with the size of the prediction error in inter-field coding.

Performing intra-field coding for the signals one of the field images of the reference frame and performing inter-field coding for the other of the signals of the field images enables the amount of coding of the image signals of the reference frame to be reduced.

BRIEF DESCRIPTION OF THE DRAWINGS

In the appended figures.

DETAILED DESCRIPTION OF THE PREFERRED EMBODIMENTS

The following is a detailed description of preferred embodiments of the compression method for interlaced moving images according to the present invention (hereinafter, termed simply "compression method"), with reference to the appended drawings.

Figure 6:
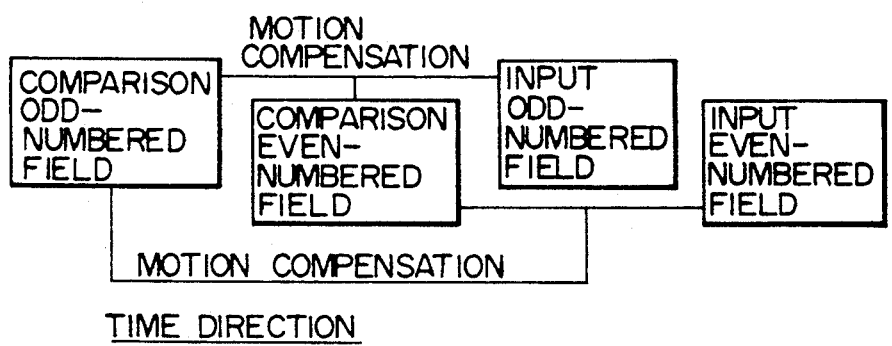
FIG. 6 is a block conceptual diagram showing an interlaced moving picture according to a first embodiment of the present invention.
Figure 7A:
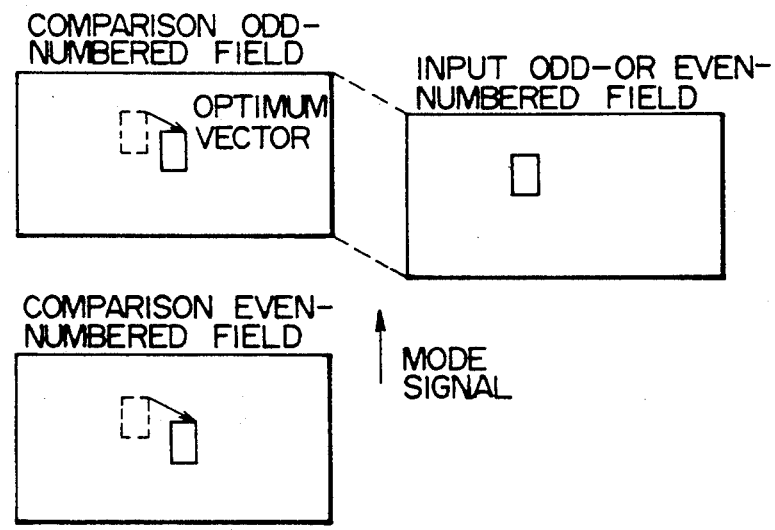
FIGS. 7A and 7B are conceptual diagrams describing the compression method shown in FIG. 6.
Figure 7B:
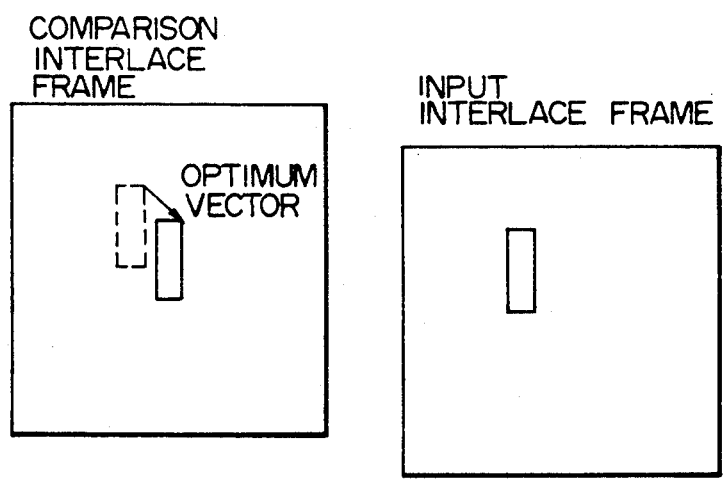

FIG. 6 is a block conceptual diagram showing an interlaced moving picture according to a first embodiment of the present invention, and FIGS. 7A and 7B are conceptual diagrams describing the configuration of the compression method shown in FIG. 6.

As shown in FIG. 6, FIG. 7A and FIG. 7B, the compression method according to the first embodiment divides an input frame image into input field images (odd-numbered fields and even-numbered fields). A comparison field image that has been divided comparison frame into the odd-numbered fields and the even-numbered fields, is compared with the input field image that has been divided, and the optimum vector is detected and selected from the motion vectors detected from the compared field images. The comparison field image on the side that the detected and selected vector has been determined has the motion vector coded (variable length coding) along with a difference value when a prediction value that has been shifted by the amount of the motion vector is subtracted from the input field image value.

Figure 8:
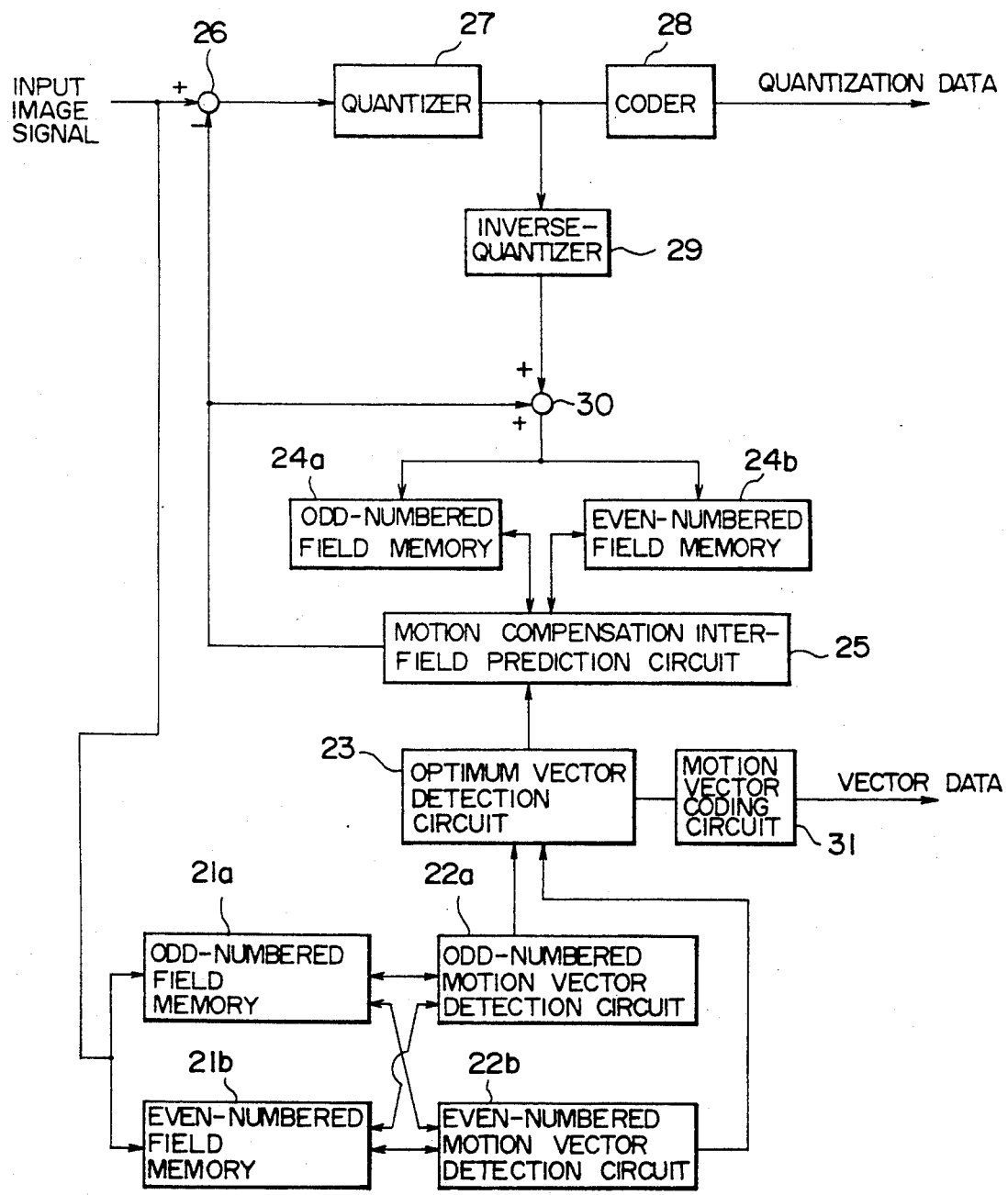
FIG. 8 is a block diagram showing a motion compensation prediction coding circuit as a specific example of the compression method shown in FIG. 6.

The following is a description of the motion compensation prediction coding according to the compression method of the present invention, and with reference to FIG. 8. FIG. 8 is a block diagram showing a motion compensation prediction coding circuit as a specific example of the compression method shown in FIG. 6;

In FIG. 8, an input interlaced moving image, that is a comparison image and an input image, are divided into odd-numbered fields and even-numbered fields, and are respectively stored in an odd-numbered field memory 21a (24a) and an even-numbered field memory 21b (24b). Then, as shown in FIGS. 6 and 7A, the next-stage odd-numbered field motion vector detection circuit 22a and even-numbered field motion vector detection circuit 22b respectively detect the optimum motion vector between either the odd-numbered field image or the even-numbered field image for comparison and the field images that have been input. The motion vector is detected using the block matching method, for example.

Figure 1:
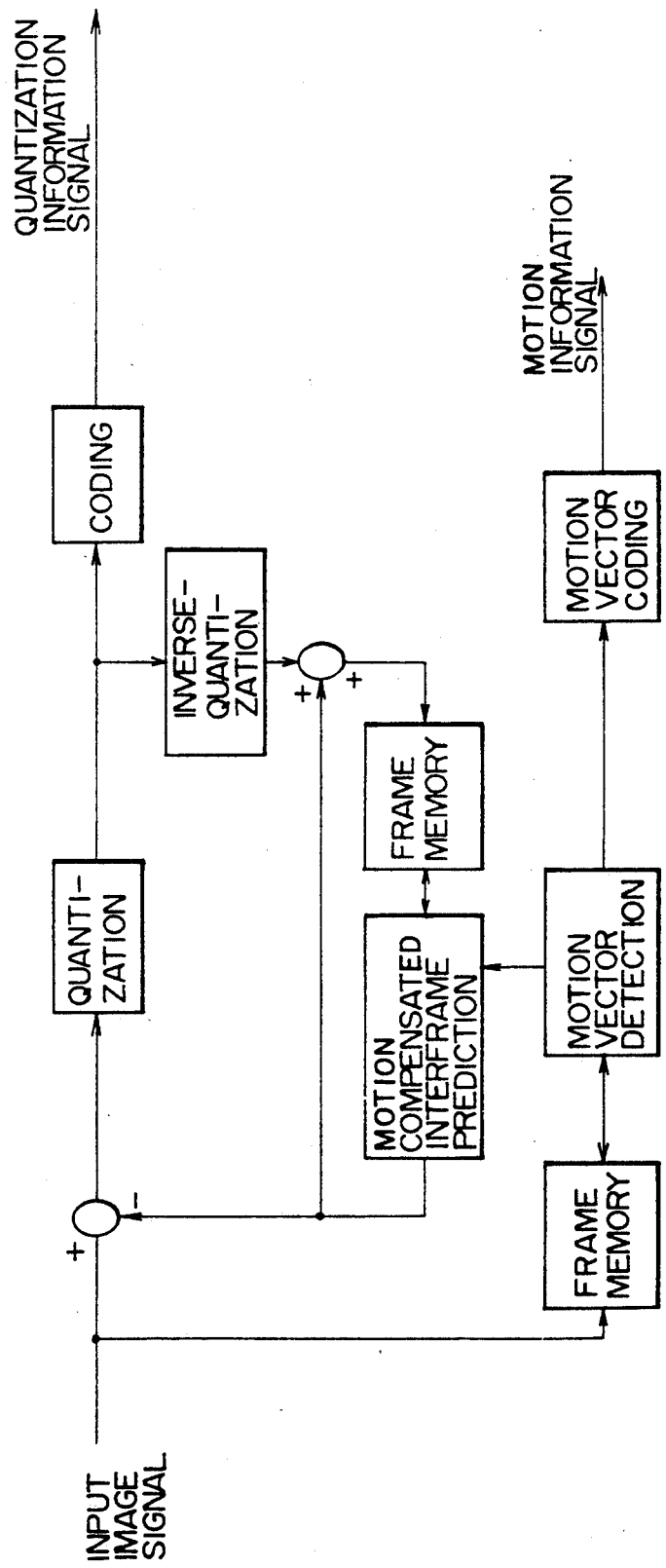
FIG. 1 is a view showing a block configuration of a motion compensation inter-frame prediction coding method according to a first, conventional example.
Figure 2:
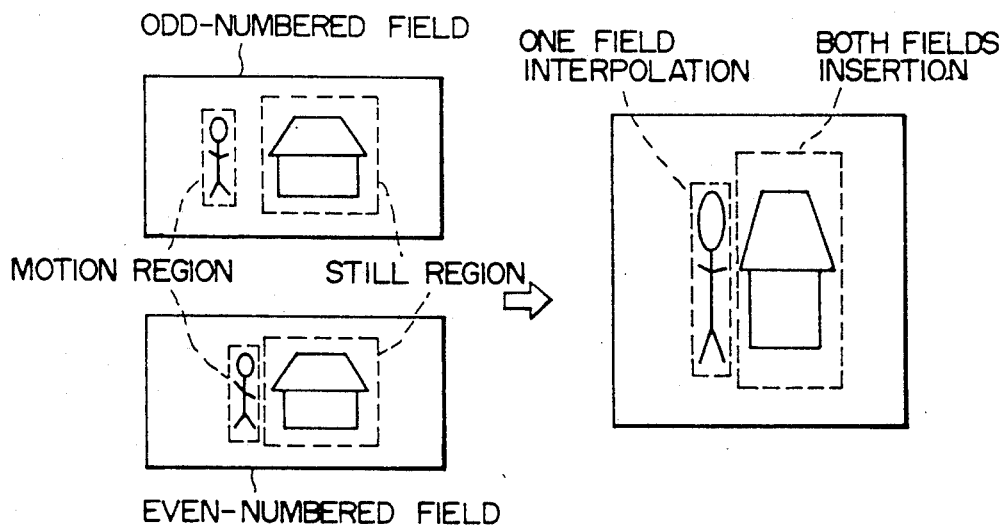
FIG. 2 is a conceptual view showing the method of generating an application frame by a still region and a moving region, and according to a second, conventional example.
Figure 3:
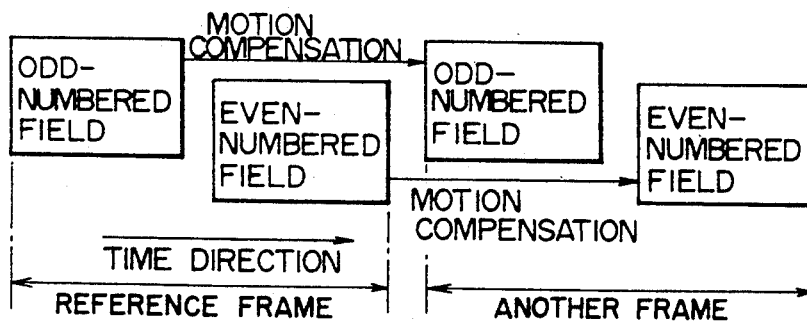
FIG. 3 is a block diagram showing a method of motion compensation by division into odd-numbered fields and even numbered fields, and according to a third, conventional example.
Figure 4:
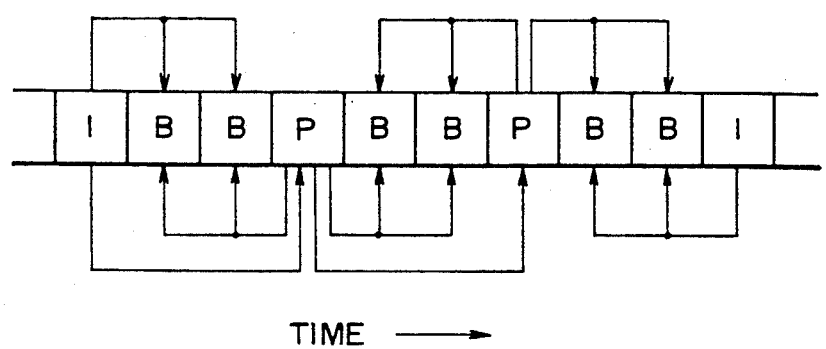
FIG. 4 is a view describing the coding syntax of the MPEG standards proposal, according to a fourth, conventional example.
Figure 5:
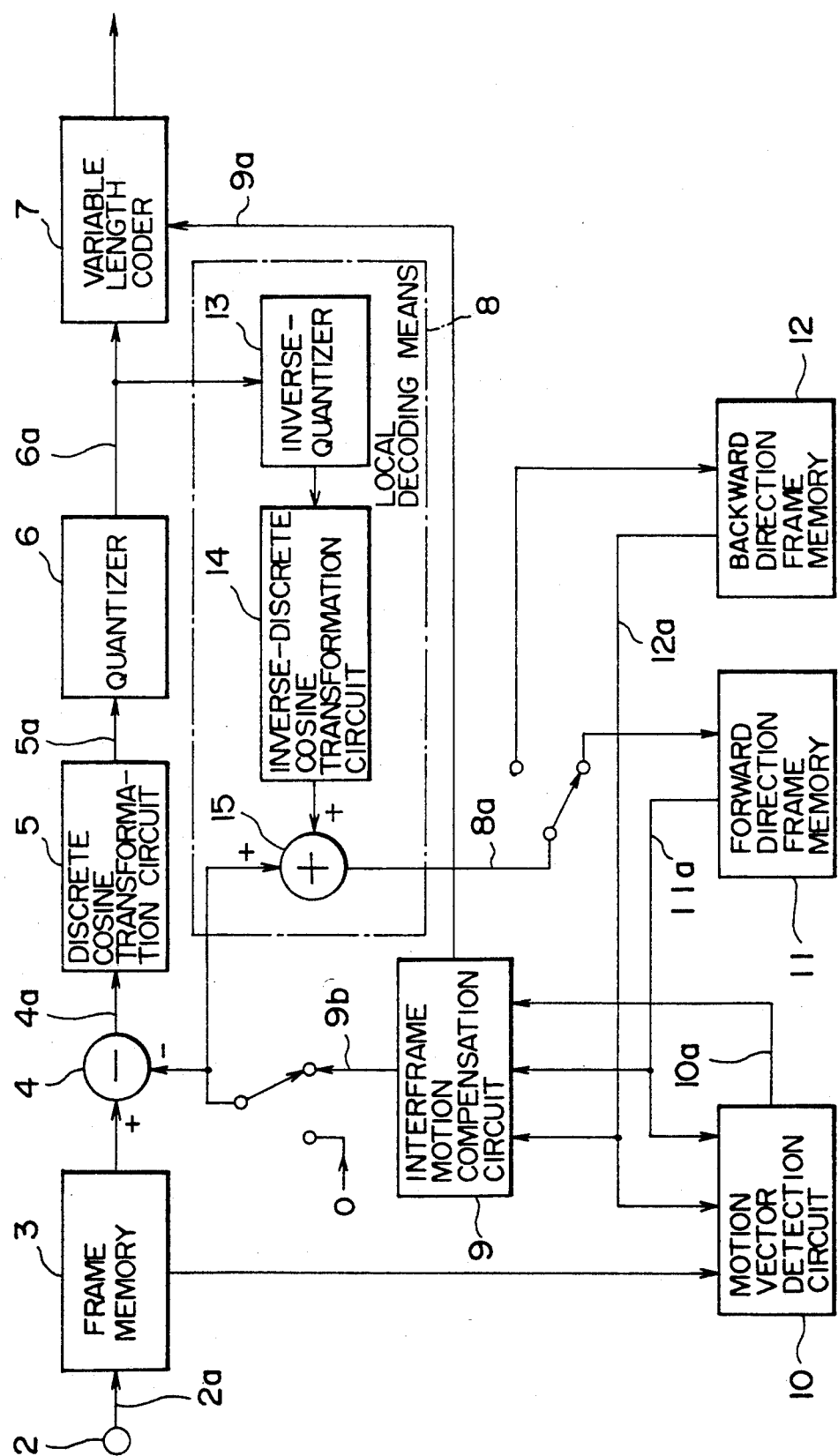
FIG. 5 is a block diagram of a coding apparatus of the MPEG standards proposal of the fourth, conventional example.

The motion vectors that have been determined with respect to the respective comparison field images, have their evaluation values for the error upon detection compared by the next-stage optimum vector detection circuit 23, and the vector that has the smallest error is selected as the determined optimum motion vector. Then, the motion compensation inter-field prediction circuit 25 reads the comparison image data at a position that has been shifted by the amount of the motion vector, from the spatial position of the input field image, by the memories 24a, 24b of the field images on the side for which the selected motion vector was detected, and codes outputs the differential value with the input image along with the motion vector. As shown in FIG. 1 and in the same manner as the conventional manner, the motion compensation inter-field prediction circuit 25 comprises a differentiator 26, a quantizer 27, a coder 28, a inverse quantizer 29, and an adder 30.

At this time, the motion vectors that have been selected as the optimum motion vectors are detected with respect to the respective blocks obtained by division inside the image into two-dimensional blocks (of 8×8 picture elements for example), and as shown in FIG. 7A, the two pieces of information of the vector values detected for each block (and expresses as the two-dimensional vectors in the horizontal direction and the vertical direction) and mode signals that express which field image the vector value is from, are detected.

In this case, if the vector values are the same for between adjacent blocks, they tend in approximately the same direction and the adjacent differential converges on a value that is close to zero, an the amount of information can be compressed by a large amount if variable length coding is performed. However, the mode signals do not enable sufficient compression of the amount of information since there is a small adjacency correlation.

Figure 9A:
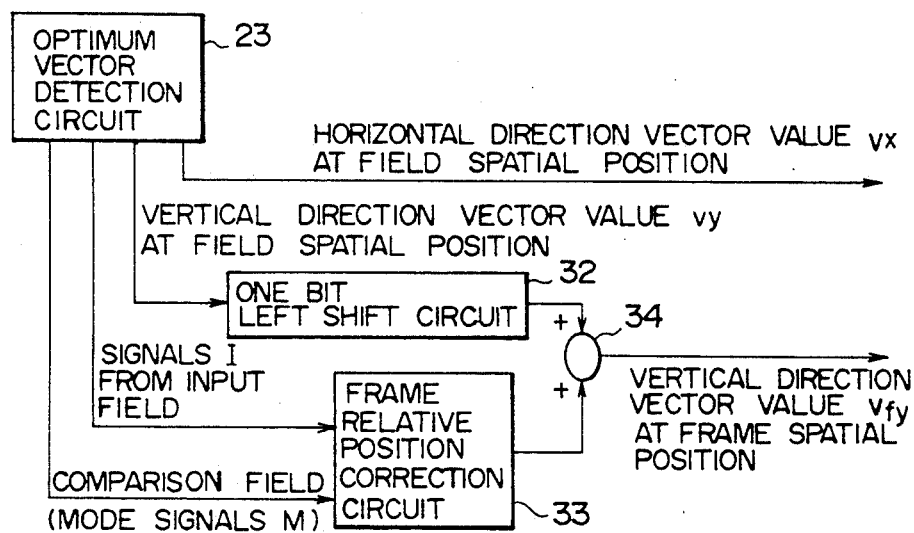
FIGS. 9A and 9B are block diagrams respectively showing a motion vector coding circuit portion of the circuit of FIG. 8, and the corresponding decoding circuit.
Figure 9B:
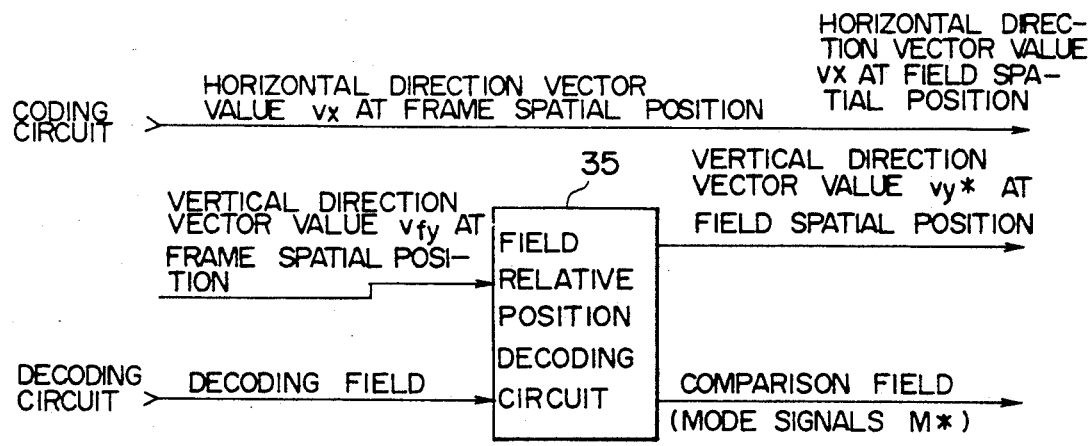

Here, as shown in FIG. 7B, the vector value is expressed as a motion vector at a spatial position of the frame image in the interlaced status. If this is done, then the motion vector value and the mode signals can be decoded without coding the mode signals. FIGS. 9A and 9B show on example of coding circuit 31 and decoding circuit for the motion vector.

As shown in FIG. 9A, input to the side of the coding circuit are input the vector value (vx, vy) corresponding to the field spatial position, the signals I (expressed as 1-bit using for example, "1" if there is an odd-numbered field, or "0" if there is an even-numbered field) that express the type of field of the input field, and the mode signals M (expressed as 1-bit using for example, "1" if there is an odd-numbered field, or "0" if there is an even-numbered field) that express which field the vector value is from. The vertical direction value Vy of the vector value is multiplied by two (that is, it undergoes processing by the left sift circuit 32 to shift it to the left) and this output value is added by the adder 34 with the compensation value that is output by the calculation of the signals I and the mode signals M in the frame relative position correction circuit 33, to give Vfy, and as shown in FIG. 7A and FIG. 7B, the output is a vector value in the vertical direction and corresponding to the frame spatial position. Interlace is performed with respect to the vertical direction and so the vector value Vx in the horizontal direction is output as the vector value in the horizontal direction and corresponding to the frame spatial position as it is.

Moreover, in the calculation in the frame relative position correction circuit 33, when the same field spatial position for odd-numbered fields and the even-numbered fields is compared at the frame spatial position, the odd-numbered fields are positioned one line higher in the vertical direction than are the even-numbered fields and so this enables correction of the relative position by the output of (I - M).

In addition, as shown in FIG. 9B, the side of the decoding circuit has the field relative position decoding circuit 35 receiving the vector value Vfy of the vertical direction and corresponding to the frame spatial position, and performing the calculation for the signal F (=I) that expresses which field the field that is decoded with that vector value is, and the mode signal M* and the vector value vy* in the vertical direction and corresponding to the field spatial position are decoded and output.

Moreover, Vy* and M* are expressed by the following equation.

$$M^* = abs((Vfy - F) mod 2)$$

(Where, abs: absolute value, mod2: remainder after division by 2)

$$Vy^* = (Vfy + M^* - F)/2$$

When coding of the motion vector is performed in this manner, the motion vector values that are corrected as the frame spatial positions tend in a direction that is substantially equal when the object of decoding between adjacent blocks is the same, and the adjacent differential converges on a value close to zero. Accordingly, it is possible to have a large amount of information compression using variable length coding, and it is also possible to have judgment on the decoding side for which field the motion vector is from, and without the use of mode signals.

Conventionally, when compensation prediction coding was performed with respect to interlace images, either a frame that was not interlaced was generated by two fields and the motion vector was detected with respect to this frame and prediction coding performed, or prediction coding was performed to handle to fields that were completely separated, but as described in detail earlier, the compression method of a first embodiment of the present invention selects an optimum motion vector from respective comparison fields and with respect to input field images and performs motion compensation prediction coding so that it is possible to avoid obstacles in the time direction and which are due to interlacing, and it is also possible to effectively use the correlation between fields.

In addition, the mode signals that express which field has been selected could not enable sufficient compression of the amount of information since the adjacency correlation was small but it is possible to have decoding without the transmission of mode signals, by expressing the vector value as a motion amount for the interlaced frame images and so it is possible to have a large amount of compression of the information amount by the performance of variable length coding.

Moreover, in the embodiment described in detail above, the vector value is expresses as the amount of motion as a frame spatial position but even if the vector value in the vertical direction of the field spatial position is multiplied by two and a mode signal is appended to the lowest bit and made a motion vector value, then there is no loss in the adjacency correlation of the vector value and it is possible to have sufficient compression of the amount of information.

The following is a detailed description of second and third embodiments of the present invention, with reference to the appended drawings.

Figure 10:
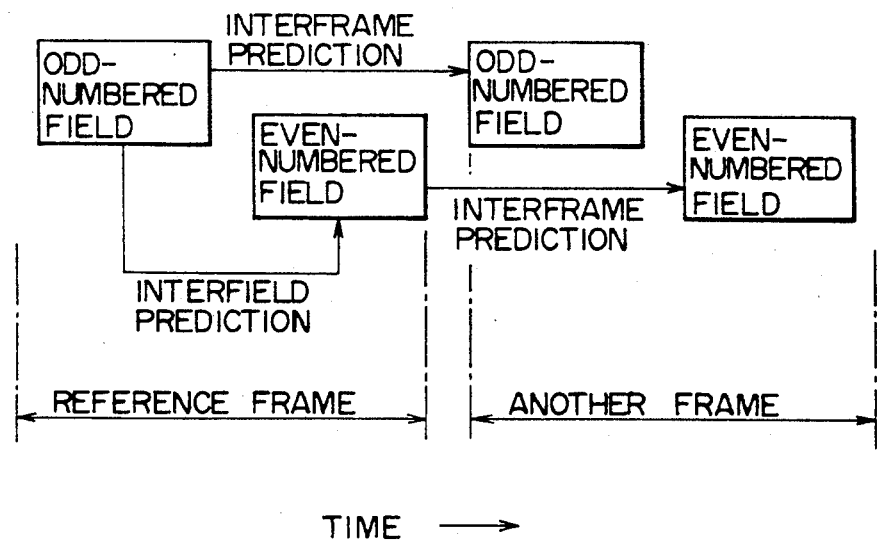
FIG. 10 is a block diagram illustrating the concept of the interlace moving image prediction coding method relating to a second embodiment of the present invention.

FIG. 10 is a block diagram illustrating the concept of the interlace moving image prediction coding method relating to a second embodiment of the present invention.

With respect to interlaced image signals that form one frame from odd-numbered fields and even-numbered fields, the coding method relating to the present invention has image signals of each field in the frame performing inter-frame prediction coding for the field in other frame and is characterized in that the reference frames that are set for every predetermined interval between frames have the image signals for one field (such as an odd-numbered field) performing intra-field coding, and image signals for one field (such as an even-numbered field) performing inter-field coding.

Figure 11:
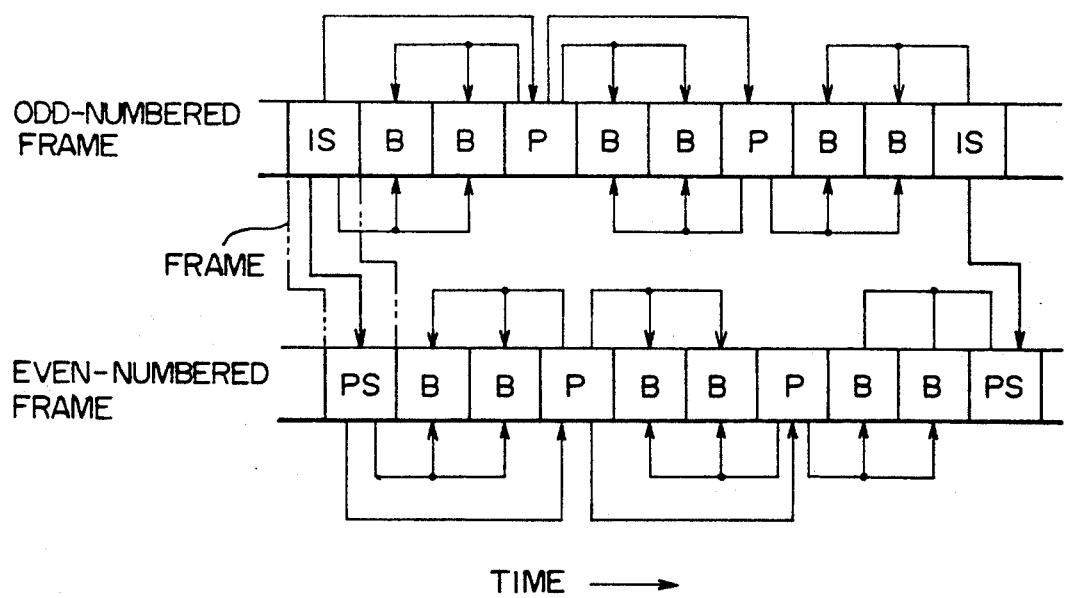
FIG. 11 is a view describing the coding syntax according to the first example, for the case where the prediction coding method shown in FIG. 10 is applied to the standards proposal of the MPEG method.

FIG. 11 is a view describing the coding syntax according to the first example, for the case where the prediction coding method shown in FIG. 10 is applied to the standards proposal of the MPEG method.

In the figure, IS is a reference field of a reference frame, and the image signals of this reference field IS perform intra-field coding linking the coding inside that field.

PS is another field of a reference frame, and the image signals of this field PS are coded by the reference field IS and the inter-field prediction.

A capital letter P denotes a sub-reference field, and the image signals of this sub-reference field P are coded by inter-frame prediction of the fields IS and PS corresponding to the previous reference frame.

The other field B is coded by the application of inter-frame prediction in the optimum direction and using one of the three methods of forward-direction, backward-direction and forward- and backward-direction prediction, for between fields corresponding to the reference fields IS, PS or the sub-reference field P either temporally before or after that field B.

Figure 12:
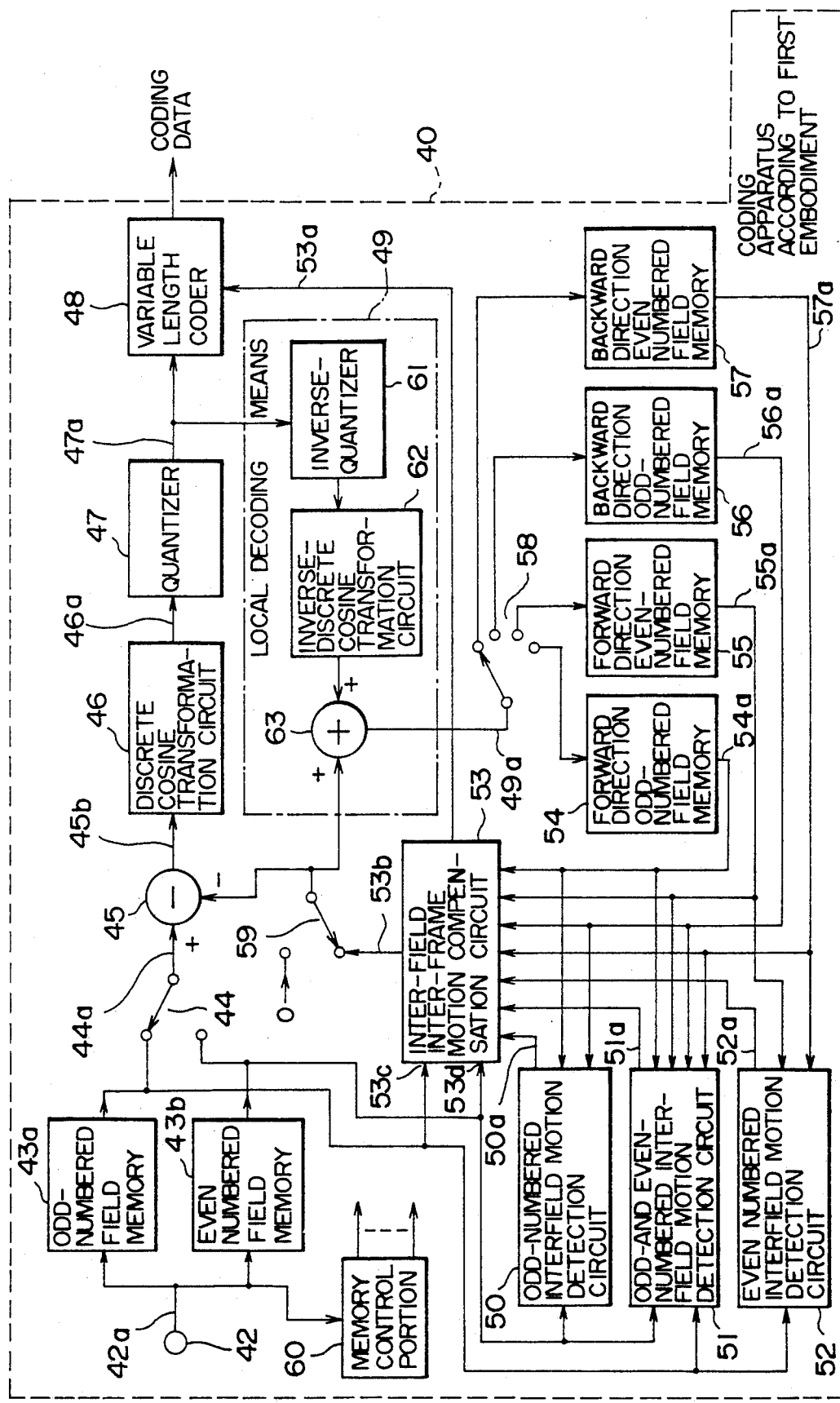
FIG. 12 is a block diagram showing the configuration of a coding apparatus according to the first embodiment, and which has the coding method of the first example used in the second embodiment and applied to the MPEG method.

FIG. 12 is a block diagram showing the configuration of a coding apparatus according to the first embodiment, and which has the coding method of the first example used in the second embodiment and applied to the MPEG method.

The coding apparatus 40 according to the first embodiment comprises an odd-numbered field memory 43a and an even-numbered field memory 43b that temporarily store interlaced digital image signals 42a that are supplied to the input terminal 42, a field image signal selector means 44 that selects one of the read outputs of the odd-numbered field memory 43a and the even-numbered field memory 43b, a subtractor means 45 that inputs the field image signals 44a and the prediction image signals 45a that are selected by the selector means 44 and outputs the prediction error signals 45b which are the difference between the two, a discrete cosine transformer 46 that implements discrete cosine transformation with respect to the prediction error signals 45b and outputs a transformation coefficient 46a, a quantizer 47 that uses a predetermined weighting coefficient to quantize the transformation coefficient 46a, a variable length coder 48 that codes the motion vector along with the quantized output 47a and information 53a relating to the calculation conditions and outputs coded data 48a, a local decoding means 49, three types of motion detection circuits 50, 51, 52, a inter-field/inter-frame motion compensation circuit, four field memories 54, 55, 56, 57 that temporarily stores the decoded image signals 49a that are decoded via the local decoding means 49, a switching means 58 that switches the supply source of the local decoding means 39a, a prediction image information switching means 59 that performs switching between whether zero information is to be supplied or whether a motion compensation prediction image 53b generated by the inter-field/inter-frame motion compensation circuit 54 is to be supplied to the subtractor means 45, and a memory control portion 60 that performs control of read/write to and from each of the memories 43a, 43b, 54, 55, 56 and 57, and each of the selection and switching means.

The local decoding means 49 is provided with an adding means 63, an inverse cosine transformer 62 and an inverse quantizer 61 so as to decode the prediction error signals 45b.

The field image signal selector means 44, the decoded signal switching means 58 and the prediction image information switching means 59 are configured using electronic switching elements such as bus selector circuits and the like to switch on the basis of switching control signals (not shown in the figure) that are output from the memory control portion 60.

The memory control portion 60 monitors the interlace image signals 42a that are input, judges whether the currently input signals are signals of either even-numbered fields or odd-numbered fields, and performs write to the corresponding field memory 43a, 43b, and also performs management for the write region, and for which frame is to be made the reference frame.

In order to perform inter-frame prediction from the forward direction and the after direction as shown in FIG. 11, each of the field memories 43a and 43b each have at least the capacity to store image signals 42a of the necessary number of fields.

When there is the processing of image signals of the reference field IS of the reference frame, the memory control portion 60 switches the field image signal selector means 44 to the side of the odd-numbered field memory 43a, and also reads the image signals of the reference field IS after switching the prediction image information switching means 59 to the zero-signal side.

By this, the image signals of the reference field IS are supplied as they are to the discrete cosine transformation circuit 46 as the prediction error differential signals 45b, and quantization and coding are performed at the quantizer 47 and the coder 48. Moreover, at this time, the information 53a that is the coded reference field IS is output from the inter-field/inter-frame motion compensation circuit 53.

In addition, the memory control portion 60 writes the decoded signals 49a of the reference field IS that are decoded by the local decoding means 49, to the forward direction odd-numbered field memory 54 or the after direction odd-numbered field memory 56 via the decode signal switching means 59.

When there is the processing of the image signals of the other field PS of the reference frame, the memory control portion 60 reads the image signals of the reference field IS from the even-number field memory 43b, and supplies each of the image signals to the even-numbered field motion detection circuit 51.

The odd- and even-numbered inter-field motion detection circuit 51 uses the two types of image signals given to it as the basis for the estimation of that motion vector 51a, and outputs them to the inter-field/inter-frame motion compensation circuit 53.

The memory control means 60 switches the field image selector means 44, to the direction opposite that shown so that the read output of the even-numbered field memory 43b is supplied to the subtractor means 45, and so that the output of the inter field/inter-frame motion compensation circuit 53 is supplied to the subtractor means 45.

In addition, the memory control portion 60 reads the image signals that have been decoded by the reference image field IS that is stored prior to the forward direction odd-numbered field memory 54 and the after direction odd-numbered field memory 56, and supplies those read signals 54a and 54a to the inter-field/inter-frame motion compensation circuit 53.

The inter-field/inter-frame motion compensation circuit 53 uses the motion vector 51a as the basis for the implementation of motion compensation for image signals of the decoded reference field, and outputs the motion-compensated motion compensation prediction image signals 53b.

The subtractor means 45 outputs the prediction error between the motion compensated prediction image signal 53b and the image signals of the other field PS of the reference frame that is supplied via the field image signal selector means 4, and outputs the decoded data 48a that has been inter-field prediction coded by the transformation, quantization and coding of those prediction error signals 45b.

In addition, the memory control circuit 60 controls the decoding signal switching means 59 and stores the image signals of the field PS that has been decoded at the local decoding means 49, to the forward direction even-numbered field memory 55 or the backward direction even-number field memory 57.

Moreover, at this time, the inter-field/inter frame motion compensation circuit 53 is configured so as to output information relating to the motion vector, and information that is inter-field prediction coded, and these items of information 53a are coded at the variable length coder 48.

When the processing of the two fields IS and PS of the reference frame is completed, the memory control portion 60 performs coding processing for the sub-reference field P.

The memory control portion 60 first reads the image signals of the sub-reference field P from the odd-numbered field memory 43a, and reads the decoded signals 54a and 55a of the reference field I from the forward-direction odd-numbered field memory 54 and the after-direction odd-numbered field memory 56, and supplies them to the odd-numbered inter-field motion detection circuit 50.

The same processing method is used to perform inter-frame prediction coding for the sub-reference fields of even-numbered fields, and those decoded signals 49a are stored in the after-direction even-numbered field memory 57 and the forward direction even-numbered field memory 55.

The following is a description of the coding method for the other field B, using the example of the odd-numbered fields.

The memory control portion 60 first reads the image signals of the coded field B from the odd-numbered field memory 43a, and reads the decoded signals of the sub-reference field P or the forward-direction reference field I from the forward-direction odd-numbered field memory 54. The odd-numbered inter-field motion detection circuit 50 outputs the motion vector 50a with respect to the backward-direction image and the inter-field/interframe motion compensation circuit 53 temporarily stores the motion vector from the after direction.

Then, the inter-field/inter-frame motion compensation circuit 53 generates forward-direction prediction image signals for which compensation has been performed on the basis of the motion vector from the forward direction, with respect to the image signals 54a that have been read from the forward-direction odd-numbered field memory 54, and temporarily stores them.

In addition, the inter-field/inter-frame motion compensation circuit 53 generates backward-direction prediction image signals for which compensation has been performed on the basis of the motion vector from the after direction, with respect to the image signals 56a that have been read from the backward-direction odd-numbered field memory 56, and temporarily stores them.

Furthermore, the inter-field/inter-frame motion compensation circuit 53 generates forward-direction prediction images that take the average level for example, of each picture element, from the two prediction image signals for the forward direction and the after direction, and stores the prediction image signals for both directions.

Then, the inter-field/inter-frame motion compensation circuit 53 performs comparison between the three types of prediction image signals for the forward-direction, the backward-direction and the forward/after directions, and the coded object image signals that are taken from the original image input terminal 53c, and selects the prediction image signals that have the highest correlation and outputs them, along with the information relating to the motion vector corresponding to the information relating to the selected type of prediction image.

The same coding processing is performed for the other odd-numbered field B.

The coding apparatus 40 that has the configuration described above has the performance of inter-frame prediction coding between pairs of odd-numbered frames and even-numbered frames as the basis, and for reference frames that are set for each predetermined frame interval, makes one field the reference field IS, and for this reference field IS, performs intra-field coding to combine coding inside that field, while the other field PS has inter-field prediction coding performed with the reference field IS so that it is therefore possible to reduce the amount of coding of the reference frame.

Figure 13:
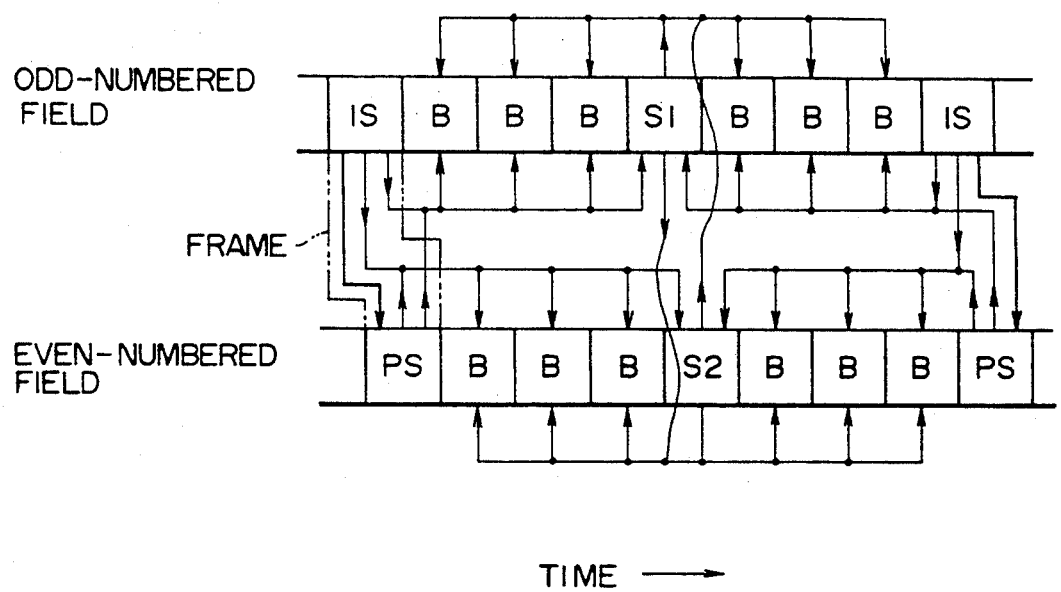
FIG. 13 is a view describing the coding syntax according to the second example and relating to another application of the second embodiment of the present invention.
Figure 14:
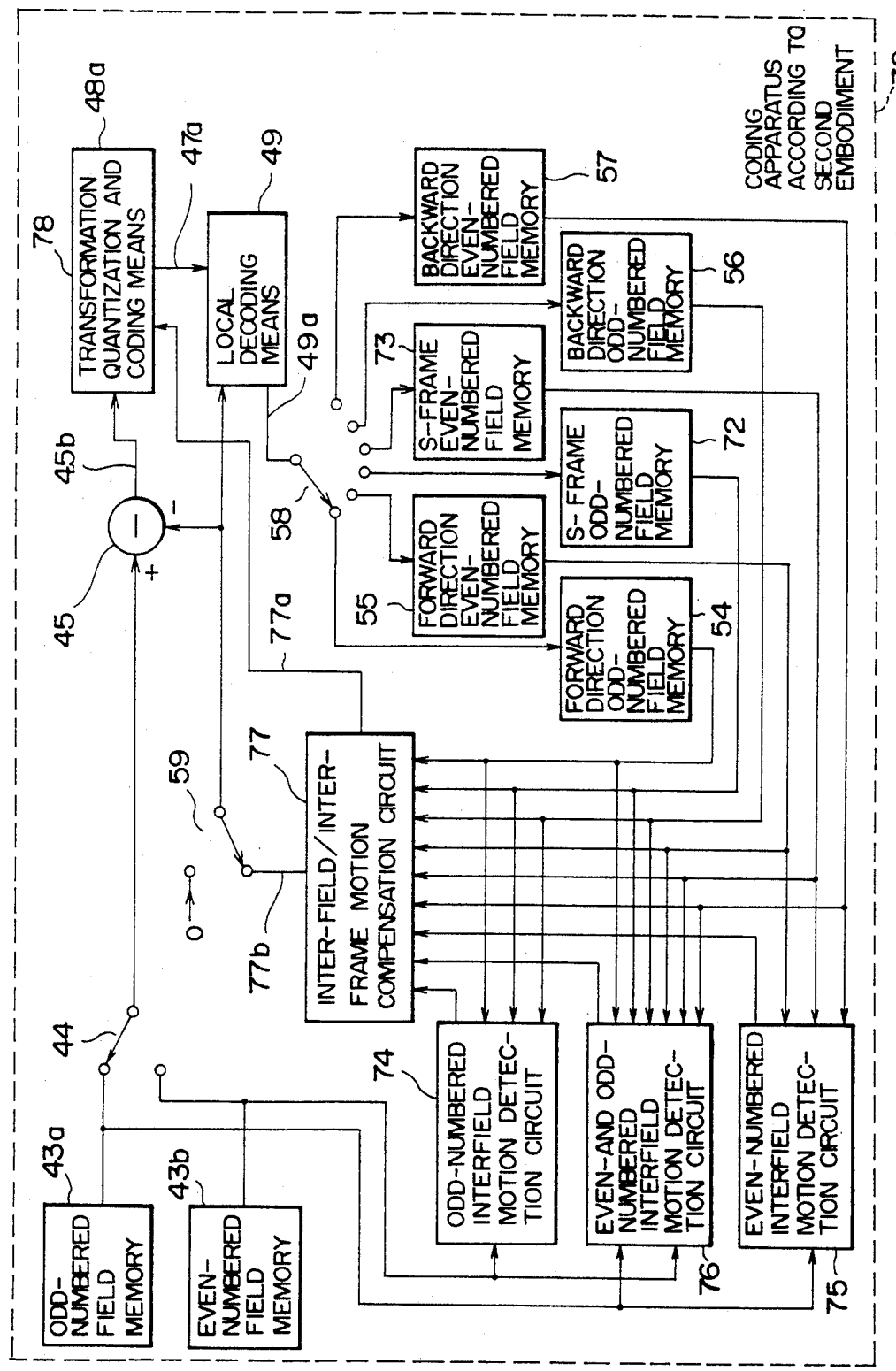
FIG. 14 is a block diagram showing the configuration of main portions of the coding apparatus of the second embodiment, that realizes the prediction coding method relating to the second example of the second embodiment of the present invention.

FIG. 13 is a view for describing a second example of the coding syntax relating to another example of the application of the second embodiment of the present invention, while FIG. 14 is an outline block configuration of a second example of a coding apparatus as another application example.

The coding method shown in FIG. 13 sets a reference frame for a frame interval of 2×M (where M is a natural number), and also sets one sub-reference frame between reference frames, and for each of the fields S1, S2 of that sub-reference frame, performs forward- and backward-direction, bi-directional inter-frame prediction from each of the fields IS and PS of the reference frames before and after those fields S1 and S2.

The coding apparatus 70 shown in FIG. 14 is the coding apparatus 40 of the first example shown in FIG. 12, to which has been added a S-frame odd-numbered field memory 73 and an S-frame odd-numbered field memory 72 that store the decoded signals of the sub-reference frames S1, S2.

Moreover, in FIG. 14, the memory control portion and the input portion for the interlace digital image signals have been omitted.

The interlace image signals supplied from the input terminal not shown in the figure are respectively stored to the odd-numbered field memory 43a and the even-numbered field memory 43b.

The two fields IS and PS that are not reference frames that become reference images with respect to the field B shown in FIG. 13, are respectively stored in the forward-direction odd-numbered field memory 54 and the forward direction even-numbered field memory 55, or the backward-direction odd-numbered field memory 56 and the backward-direction even-numbered field memory 57, and the two fields S1 and S2 inside the sub-reference frame are respectively stored in the S-frame odd-numbered field memory 72 and the S-frame even-numbered field memory 73, and for each respective field, the odd-numbered inter-field motion detection circuit 74, the even-numbered inter-field motion detection circuit 75 determine the inter-frame motion vectors along with the decoded image signals stored in the forward-direction field memories 54 and 55, and the after-direction field memories 56 and 57 for the same field inside the frame (the fields IS, PS, S1, S2) that become the reference.

The fields for which the motion vectors have been determined have motion compensation between frames performed in the inter field/inter-frame motion compensation circuit 77. and application motion compensation prediction of the three prediction methods of forward-direction, backward-direction and forward- and backward-direction, bi-direction interpolation prediction are performed with respect to each of the fields.

The prediction image signals 77b predicted by the inter-field/inter-frame motion compensation circuit 77 and the prediction error signals 45b and the input field image signals undergo each type of processing by the transformation, quantization and coding means 78 provided with a discrete cosine transformation circuit 46, a quantizer 47 and a variable length coder 48 shown in FIG. 12, and the coded data 48a is output.

With respect to the two fields S1 and S2 inside the sub-reference frame, the odd-numbered inter-field motion detection circuit 74 and the even-numbered inter-field motion detection circuit 75, for each field, separately determines the inter-frame motion vector with the decoded image signals that are stored in the forward-direction field memories 54 and 55, and the backward-direction field memories 56 and 57 for the same fields IS and PS inside the frame that becomes the reference, and in the inter-field/inter-frame motion compensation circuit 77, application motion compensation prediction is performed between frames using the three prediction methods of forward-direction, backward direction and forward- and backward-direction, bi-direction interpolation prediction, and those prediction error signals 45b are process by the transformation, quantization and coding means 78 and the coded data 48a is output.

On the one hand, with respect to the two fields IS and PS inside the reference frame, and in exactly the same manner as has been described before, coding processing is performed in the transformation, quantization and coding means 78 without one of the fields (the odd-numbered field in this case) performing motion compensation prediction. Then, the quantized output 47a has inverse transformation and decoding performed at the local decoding means 49, and the decoded image signals are stored in either the forward-direction odd-numbered field memory 54 or the backward-direction odd-numbered field memory 56.

The odd- and even-numbered inter-field motion detection circuit 76 detects the motion vector for the other field as well, from a separate field (odd-numbered field) inside the same frame and which has been stored in the forward-direction field memories 54 and 55, and the backward-direction field memories 56 and 57, and the inter-field/inter-frame motion compensation circuit 77 performs inter-field motion compensation prediction and uni or one-direction motion compensation prediction, and the prediction error signals 45b and the input field images and the predicted images are coded in the transformation, quantization and coding means 78.

In addition, the quantized coefficients 49a, undergo inverse transformation and decoding at the local decoding means 49 and the decoded signals that are added to the predicted image signals 77b at the inter-field/inter-frame motion compensation circuit 77 are respectively stored in either the forward-direction even-numbered field memory 55 or the backward-direction even-numbered field memory 57.

Figure 15:
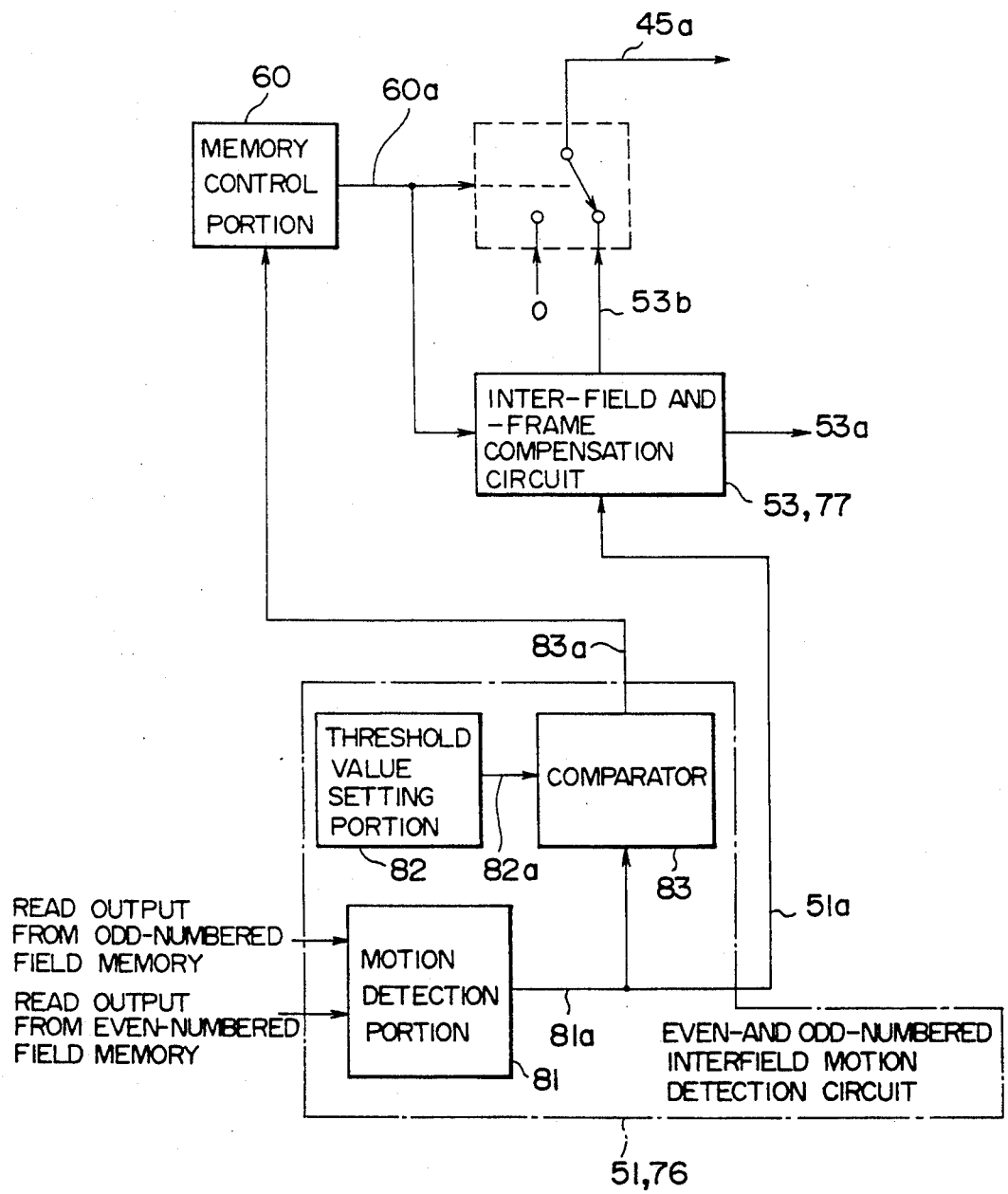
FIG. 15 is a block diagram showing the configuration of main portions of the coding apparatus of the second embodiment, that realizes the prediction coding method relating to the third embodiment of the present invention.

FIG. 15 is a block diagram showing the configuration of main portions of the coding apparatus of the second embodiment, that realizes the prediction coding method relating to the third embodiment of the present invention. Those portions that correspond to portions of FIG. 12 and FIG. 14 are indicated with corresponding numerals.

The odd- and even-numbered inter-field motion detection circuits 51 and 76 are provided with a motion detection portion 81, a threshold value setting portion 82 and a comparator 83.

The motion detection portion 81 detects the motion vector on the basis of the read output from the odd-numbered field memory and the even-numbered field memory, and outputs a value 81a relating to the amount of motion.

The threshold value 82a relating to the amount of motion that is allows inter-field prediction coding is set beforehand in the threshold value setting portion 82.

The comparator 83 generates the comparison output 83a that indicates that inter-field coding is not suitable when the amount of motion 81a detected by the motion detection portion 81 is greater than the threshold value 82a.

The memory control portion 60 generates a switching signal 60a on the basis of the comparison output 83a of the comparator 83, and when the inter-field motion amount exceeds the threshold value 82a, the prediction image switching means 59 performs control so that zero information is selected instead of the prediction image signals 53b output from the inter field/inter-frame motion compensation circuit 77.

By this, intra-frame coding is performed instead of inter-field coding when the correlation between each field inside the reference frame is small.

Moreover, the switching signal 60a that are output from the memory control means 60 are supplied to the inter-field/inter-frame motion compensation circuit 53 or 77 and the inter-field/inter-frame motion compensation circuit 53 or 77 outputs information 53a relating to the motion vector, as information indicating that intra-field coding has been performed on the basis of the switching signals 60a.

What is claimed is:

1. A compression method for interlaced moving image signals, comprising:
    a step that adopts an input frame image formed by a plural number of field images after dividing said input frame image into a plural number of input field images;
    a step that adopts a comparison frame image corresponding to said input frame image, after dividing said comparison frame image into a plural number of comparison field images;
    a step that detects a motion vector between said input image and each comparison field image that configures said comparison frame image; and
    a step that performs motion compensation prediction coding by selecting and using a minimum value for evalution of prediction error from said motion vector detected in said third step.

2. The compression method of claim 1, further comprising:
    a step of coding a motion vector value after transforming a value in a vertical direction in a motion vector obtained between said input field image and said comparison field image into a motion vector value between a comparison frame image and an input frame image as an interlaced frame image.

3. The compensation method of claim 1,
    wherein said plural number of field images are two field images constructing said frame, and further comprising:
    a step of coding said motion vector value by adding a value in a vertical dierection in a motion vector of said input field image corresponding to said comparison field image with one bit information which is formed at an undermost bit by multiplying twice said value in a vertical direction in a motion vector for estimating it either a motion vector with a first field image or a motion vector with a seconf field image.

4. A prediction coding method for interlaced moving image signals formed by one frame image by moving image signals divided into two fields, and comprising:
    a step that sets a reference frame for each predetermined frame interval;
    a step that performs intra-field coding so that a first field image signal of said reference frame are combined inside that field;
    a step that performs inter-field coding so that an image signal of a second field which is another field of said reference frame are predicted from said first field; and
    a step that performs inter-frame coding, and corresponding to image signals of a field corresponding to a reference frame temporally either forward or after an image signal of a frame other than said reference frame.

5. The prediction coding method of claim 4, further comprising:
    a step for performing inter-field coding of image signals of said second field, corresponding to signals that are said first field image signals that have undergone coding processing.

6. The prediction coding method of claim 4, further comprising:
    a step for performing inter-frame coding of image signals of a frame other than said reference frame, corresponding to signals that are said image signals of a field corresponding to a reference frame temporally either forward or after and that have undergone coding processing.

7. The prediction coding method of claim 4, further comprising:
    a step for performing intra-field coding so that said second field of said reference frame are combined inside that field.

8. The prediction coding method of claim 7, further comprising:
    a step of outputting a prediction error value when an inter-field prediction is performed between said image signals of said first field of said reference frame and said second field of said reference frame; and
    a step of adaptively selecting a performance of said second field either intra-field coding or inter-field coding corresponding to said prediction error value.

* * * * *